US009282055B2

(12) United States Patent
Mazarick

(10) Patent No.: US 9,282,055 B2
(45) Date of Patent: Mar. 8, 2016

(54) SYSTEM AND METHOD FOR INITIALIZING AND MAINTAINING A SERIES OF VIRTUAL LOCAL AREA NETWORKS CONTAINED IN A CLUSTERED COMPUTER SYSTEM

(71) Applicant: Virtudatacenter Holdings, L.L.C., Raleigh, NC (US)

(72) Inventor: Michael E Mazarick, Raleigh, NC (US)

(73) Assignee: VIRTUDATACENTER HOLDINGS, LLC, Raleigh, NC (US)

( * ) Notice: Subject to any disclaimer, the term of this patent is extended or adjusted under 35 U.S.C. 154(b) by 146 days.

(21) Appl. No.: 14/040,805

(22) Filed: Sep. 30, 2013

(65) Prior Publication Data
US 2014/0023082 A1  Jan. 23, 2014

Related U.S. Application Data

(62) Division of application No. 13/113,919, filed on May 23, 2011, now Pat. No. 8,549,607, which is a division of application No. 11/977,143, filed on Oct. 23, 2007, now Pat. No. 7,975,033.

(51) Int. Cl.
| | |
|---|---|
| H04L 29/06 | (2006.01) |
| H04L 12/911 | (2013.01) |
| H04L 12/46 | (2006.01) |
| G06F 15/177 | (2006.01) |
| G06F 15/173 | (2006.01) |

(52) U.S. Cl.
CPC ............ *H04L 47/78* (2013.01); *H04L 12/4641* (2013.01); *H04L 63/0272* (2013.01); *H04L 12/465* (2013.01); *H04L 63/0209* (2013.01); *H04L 63/0236* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 7,055,171 | B1 * | 5/2006 | Martin et al. | 726/3 |
| 7,925,737 | B2 * | 4/2011 | Hochmuth et al. | 709/224 |
| 2005/0254490 | A1 * | 11/2005 | Gallatin et al. | 370/389 |
| 2008/0025208 | A1 * | 1/2008 | Chan | 370/217 |
| 2009/0144393 | A1 * | 6/2009 | Kudo | 709/218 |
| 2010/0290422 | A1 * | 11/2010 | Haigh et al. | 370/329 |

* cited by examiner

*Primary Examiner* — Shin-Hon Chen

(57) ABSTRACT

A system and method for sharing network resources; the system comprising at least one network switch, at least one computing device comprising at least one network connection and at least one storage device containing software capable of initializing and maintaining: (i) a management local area network (MLAN) comprising a virtual or physical firewall; and (ii) a plurality of client virtual local area networks (VLANs), wherein each client VLAN comprises a virtual firewall and a plurality of network resources.

22 Claims, 5 Drawing Sheets

SYSTEM AND METHOD FOR INITIALIZING AND MAINTAINING A SERIES OF VIRTUAL LOCAL AREA NETWORKS CONTAINED IN A CLUSTERED COMPUTER SYSTEM

CROSS-REFERENCE TO RELATED APPLICATIONS

This application is a divisional of, and claims priority to, U.S. patent application Ser. No. 13/113,919 filed on May 23, 2011, now U.S. Pat. No. 8,549,607, which is a divisional of U.S. patent application Ser. No. 11/977,143 filed on Oct. 23, 2007, now U.S. Pat. No. 7,975,033. Both applications are incorporated by reference herein.

BACKGROUND OF THE INVENTION

Traditionally, clients of a data center are required to buy or rent physical servers, switches, and storage arrays to put into data centers to house items such as web applications, databases, voip servers, data servers, etc. This can be extremely costly for small businesses which may only need to run a small web application such as a storefront or a payroll application.

Alternatively, the same client can rent web space on a database and web server, but is often limited to what can be done with it, number of users or databases that can be contained within, or how much traffic it can receive.

What is needed is a system where a client may purchase CPU cycles, storage, and network resources "a la carte," being able to obtain only what is required by their business, no more, no less. It would be beneficial to the client to be able to purchase these resources on the fly, as needed, without having to leave the comfort of the office and having them work automatically. There would be nothing to hookup, nor anything to configure so that hardware works with one another. In addition to fully-functional servers, clients may lease shared resources and have them integrate with existing infrastructures seamlessly.

In the field metropolitan area networks (MANs), a system is used to isolate users into virtual local area networks, or VLANs. Recently, the idea of encapsulating a VLAN inside another VLAN has been introduced simply to be able to house more users. While before network engineers were limited to 256 VLANs on most equipment, they may now be able to use 256×256 separate VLANs.

What is described herein is using the concepts of VLANs and virtualization on a large pooled system to be able to dynamically allocate network resources to users, as well as bridge and share network resources.

Herein, the term "computing device" refers to any electronic device with a processor and means for data storage. Used herein, the term "network connection" refers to any means to allow a plurality of computing devices to communicate. Further, the term "trunked" used herein refers to programmatically relating multiple network connections to each other to create redundancy and greater bandwidth in a single logical connection. The term "network packets" refers to a formatted message transmitted over a network. The term "hardware resource" refers to a networkable computing device. The term "virtual resource" refers to an allocation on a networkable computing device which refers to a virtual representation of a computing device or a software application, such as a database. Used herein, the term "management local area network", sometimes referred to as a "MLAN", refers to a LAN containing hardware or virtual resources used exclusively for the initialization, configuration, and maintenance of other LANs.

Used herein, the term "data center" refers to a central storage complex containing a multitude of servers and network routing hardware. A "traditional data center" is a data center absent of virtualization. The term "virtual firewall" refers to a virtual implementation of a firewall with a virtual Ethernet port. Used herein, the term, "maintaining" refers to keeping a network resource functioning.

BRIEF SUMMARY

Disclosed herein is a system, method and computer program product for initializing and maintaining a series of virtual local area networks (VLANs) contained in a clustered computer system to replace a traditional data center. A physical network contains a management local area network (MLAN) and numerous client VLANs nested within a top-level VLAN. The MLAN contains at least a physical or virtual firewall. Each client VLAN contains a virtual firewall as well as a number of physical hardware machines and virtual machines maintained by the clustered system. The client VLAN appears as a normal subnet to the user. A network administrator is able to create, change, move, and delete virtual resources contained in a client VLAN dynamically and remotely.

The system itself connects a plurality of computer systems as a clustered system through a switched fabric communications link, such as a switch fabric communications link sold under the name INFINIBAND®. All storage devices in the system are clustered to create a distributed file system, which makes the drives appear to be a giant pool of space in which any particular virtual machine may be contained anywhere within.

Also described herein is a method for sharing a network resource, physical or virtual, between a plurality of client VLANs. The shared resource may be contained in one of the client VLANs, or in a separate top-level VLAN.

DETAILED DESCRIPTION

Figure 1:
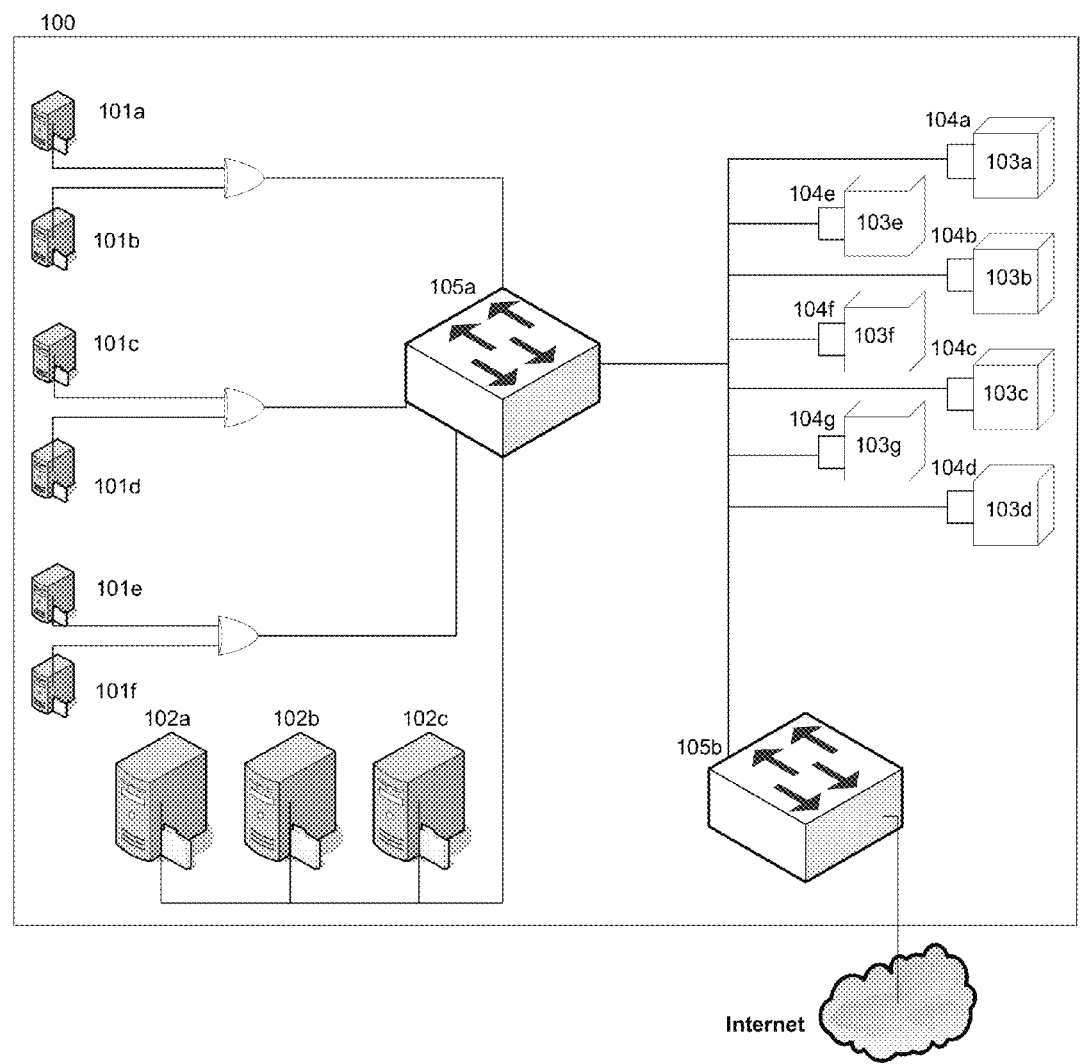
FIG. 1 is a block diagram of the hardware used in the system.

Referring to FIG. 1, system 100 comprises a plurality of redundant array of inexpensive storage nodes (RAIDS) 101a-101f, a plurality of non-redundant storage nodes 102a-102c, a plurality of processing nodes 103a-103g, a plurality of network connections 104a-104g, and a plurality of network switches 105a-105b. Storage nodes 101a-101f are redundant high level storage. Each node is mirrored for a redundant distributed fault tolerant file system. In the embodiment presented in FIG. 1, storage nodes 101a and 101b make a pair, 101c and 101d make a pair, and 101e and 101f make a pair. Non-redundant storage nodes 102a through 102c contain 48 different disk drives with no cross-server redundancy for customers who don't need the added security of redundancy.

Each processing node 103*a* through 103*g* contains 2, 4, 8, or more dual processors. In the preferred embodiment, network connections 104*a* through 104*g* may either be 6 trunked 1 Gbps Ethernet connections, or 2 trunked 4×2.5 Gbps INFINI-BAND® connections. In additional embodiments, network connections 104 may use more or less connections and use other protocols. Network switch 105*a* may be a switch such as an Ethernet switch or an INFINIBAND® switch depending on what protocol network connections 104 use; network switch 105*b* is may be a switch such as an Ethernet switch used to communicate outside the network. INFINIBAND® switches use IP-over-INFINIBAND®. The switches are able to add VLANs on a granular level. The switches may natively support Q-in-Q double tagged VLANs, which allow for nested client VLANs out of the box. In other embodiments, all nested client VLAN tags are handled by processing nodes 103. One of ordinary skill in the pertinent art will recognize that the number of components shown in FIG. 1 is simply for illustration and may be more or less in actual implementations.

Figure 2:
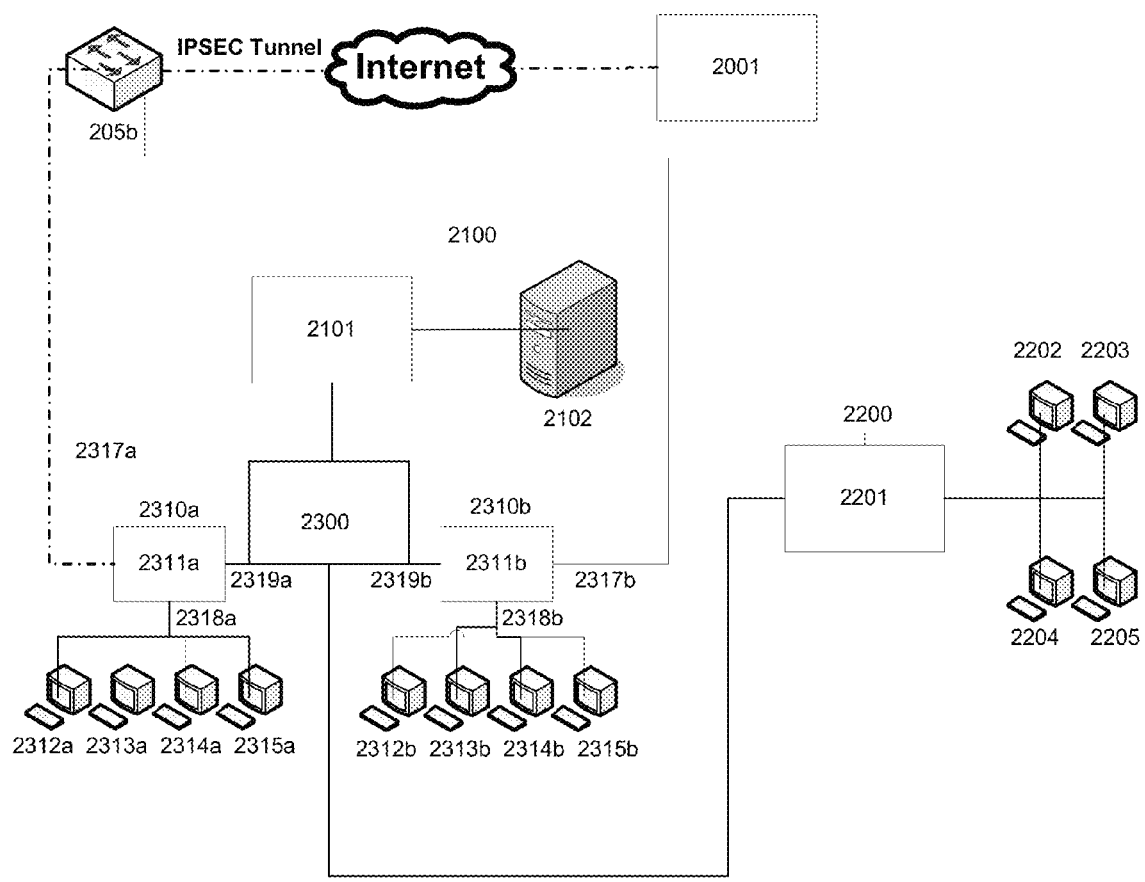
FIG. 2 is a block diagram of the VLAN structure.

Referring to FIG. 2, VLAN 2100 is a top-level VLAN used as a management LAN, or MLAN, containing the firewall 2101 initialized by the storage server. MLAN 2100 is responsible for the initialization, configuration, and maintenance of all client VLANs in system 100, as well as shared resource networks and physical networks on the system. Firewall 2101 has 3 ports, one connected to MLAN 2100, one connected to the untagged Ethernet port "VLAN 0", and one connected to VLAN 2200, the shared resources VLAN. In some embodiments, firewall 2101 is mirrored several times and referred to as a firewall cluster. The firewall cluster is spread across several multiple processing nodes 103 for faster routing. Top-layer VLAN 2300 contains multiple client VLANs 2310, all with their own firewalls, 2311. One of ordinary skill in the pertinent art will recognize that the numbers of elements depicted in FIG. 2 are only exemplary. For instance, each top-layer VLAN may contain up to 255 client VLANs.

On bootup, each storage node 101 contacts each of the other storage nodes to discover whether or not any of them has started the boot process of creating a management firewall 2101 of FIG. 2, a boot server and a management console 2102. If none of the other nodes has started the process yet, the pinging node begins the process. Initially the management firewall 2101 or a management firewall cluster is started. If the MLAN 2100 is routed by a virtual firewall, the storage nodes 101 will need to initially run the process that starts the management firewall cluster. This does not preclude a hardware firewall for the MLAN 2100, but in the preferred embodiment only servers and switches are needed and the same underlying structures that provide redundancy and availability to servers can give high availability to firewalls and routers in a virtual environment. In this preferred embodiment, a group of storage servers can start redundant copies of the firewall/router 2101. Each instance of the firewall will have the same MAC address and VLAN assignment for any attached Ethernet ports. Using normal routing schemes, this may cause a bank of switches to route packets to differing firewalls depending on the source of a connection, but this will have no ill effects if the network devices in question continue to have the same settings and routing information.

The management console 2102 has many of the same properties as the firewall in system 100. While in the preferred embodiment it is run on the storage nodes 101 as a virtual machine, can likewise be a physical machine. It is started up at the same time as the firewall/router cluster and can also be deployed in a cluster format.

In one embodiment, the boot server contains a tftp server, an NFS server, a PXE boot service and a preconfigured kernel image. This image will have a runtime environment for the local interconnect (INFINIBAND®, trunked Ethernet or other similar high speed interconnect) and the ability to mount the clustered file system that exists across the storage nodes 101. The processing nodes 103 then contact the management console 2102 for initial settings such as an IP address and host name, for example. The clustered file system is mounted and the processing nodes 103 boot in a normal fashion. Once startup is complete the processing nodes 103 contact the management console 2102 and indicate that they are ready to take a load of virtual machines to host for clients.

Once the processing nodes 103 have begun to activate, the management console 2102 gets a list of virtual machines that need to be started up by the processing nodes 103 from its datasource. The management console 2102 then begins to start virtual machines on processing nodes 103 in a weighted round robin fashion. Processing nodes 103 are assigned to groups based on their capabilities and architecture; for example, 64-bit processing nodes would be associated as a group. There is a server mask for each virtual machine that assigns it to a particular processing node group. This is both to comply with per-processor licensing issues and to ensure that virtual servers with particular hardware, redundancy or connectivity requirements can be met by the appropriate physical machine. During the startup process management console 2102 may even initiate a delay if more virtual machines exist than the bank of processing nodes 103 can run. After a predetermined interval, if this imbalance is not corrected, a warning system will be started to alert human operators of the lack of server resources. As the virtual machines are assigned to physical servers, each physical server reports CPU and memory usage to the management console 2102 and these figures are used as selection mechanisms to ensure that processor and memory loads are evenly distributed across all physical nodes. Even after the physical layer is booted, the processing nodes 103 continue to report CPU and memory usage to the management console 2102 at regular intervals.

Figure 5:
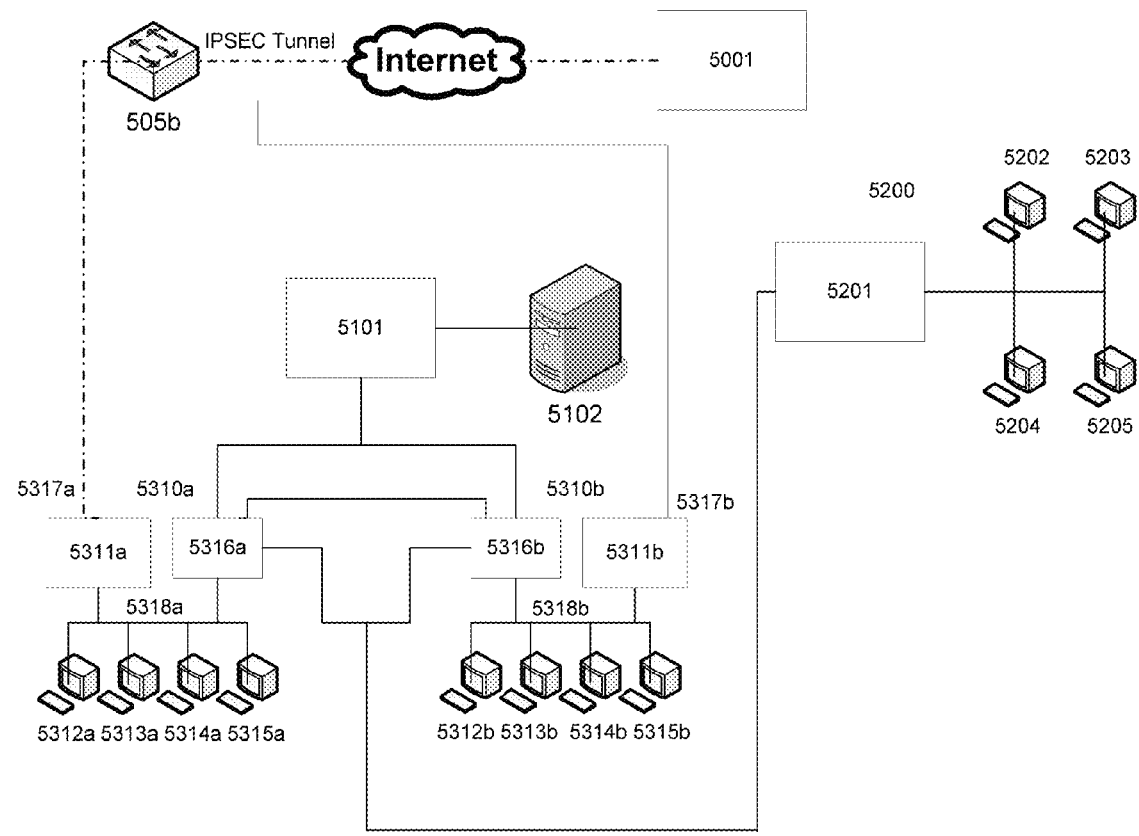
FIG. 5 demonstrates reaching shared resources through private, non-editable client firewalls.

The virtual servers undergo a normal startup process themselves. Once a command to start a virtual server is issued, (either by a system-wide startup, client start command or other system need) the management console 2102 takes the start request and queries the datasource of available processing nodes. Once one is selected by the mechanism mentioned above; that virtual server creates an Ethernet device that is attached to either the top layer VLAN or the Q-in-Q nested VLAN 2310 that the virtual server connects to. Unlike normal Ethernet devices, this VLAN device is not given an IP address or any routing information. The physical server itself does not respond and actually does not see any packets it receives from this interface. The physical device is instead mapped directly to a virtual one, giving the virtual machine access to a completely separate network than the physical machine exists on. After the appropriate network devices are added to a processing node, the management console 2102 then queries its datasource and connects to the client's hidden firewall. This firewall, as described later in reference to FIG. 5, is for routing console and virtual screen information from the MLAN 2100 back to the client's network and represents a NAT mapping from the MLAN 2100 to the clients subnet. In the current embodiment, a virtual serial port is used to add rules to this virtual routing device to keep the methodology consistent with non-addressable firewalls that clients may want to add rules and configurations to. This is not necessary, however since this translating firewalls an IP address that exists in the MLAN 2100 directly.

On startup of the virtual machine a rule is added to provide the client with console access to a web interface to the management console 2102. This gives the clients the ability to access virtual servers as if they were at the keyboard of a physical machine. From the clients secure management console web interface they are able to control the screen, keyboard and mouse inputs of their virtual servers. In the current embodiment VNC is used as a remote console but other protocols are available. During this process the virtual server itself is issued a start command and is then accessible to the client.

When a new client is added, they are given a number of external IPs and a unique subnet of their network. Every possible IP of the subnet is statically assigned to a MAC address that may or may not be used. A client VLAN 2310 is created and the first address of the subnet is assigned to the client VLAN's firewall 2311. The firewall contains a DHCP table that is created when the firewall is initialized to hold the mappings of the preregistered MAC addresses to IPs so that the IP is known as machines are added. The client is given a gateway 2001 configured to deliver the client's network packets directly to the virtual firewall 2311 through an IPSEC tunnel. In addition, network packets of all external traffic are routed directly to the client's virtual firewall 2311. Virtual firewall 2311 has one port connected to external port 2317 which receives external traffic through network switch 205b, which is equivalent to network switch 105b. Traffic from the client through the IPSEC tunnel to the client's personal VLAN 5310a is shown as a dotted line in FIG. 2. Virtual firewall 2311 further has one port connected to their personal client VLAN 2318, and in some embodiments, an optional port for connecting to shared resources 2319, such as those contained in VLAN 2200, or in another client VLAN.

The last address of the subnet is assigned as the management console 2102. The management console 2102 is connected to main firewall 2101 in MLAN 2100 and, in some embodiments, is reached through the optional port of the client firewall. From there, the client may view network settings and add machines 2312-2315. The client is able to create and be charged for virtual machines on their client VLAN through the management console 2102 remotely. The client is capable of adding 253 virtual machines. The virtual machines may be just about any kind of machine, such as a Windows or Linux web server, a voice-over-IP server, etc. After a machine is chosen, a MAC address is assigned from the client firewall 2311 and a template image corresponding to the machine from a storage node 101 is taken and initialized in storage depending on the kind of storage system the client has chosen (redundant storage nodes 101, or non-redundant storage nodes 102). From there, the management console 2102 adds the machine to the list of machines that need to be ran. The next processing node 103 that inquires on tasks that need to be run is assigned the machine. If it is the first machine run on that particular client VLAN, it starts up a virtual listening port for that VLAN. Once the virtual machine is connected to the VLAN, the firewall looks at its MAC address and assigns it its preconfigured IP address from the DHCP table.

The client is able to use VNC or remote desktop to login to the newly created virtual machine and see the user API/GUI as if they were sitting in front of a physical machine with the same image. From there the user is allowed to do anything that can be normally done on a physical machine, completely abstracted from the virtualization of the machine or the fact that it is contained in a VLAN ran on system 100 in a distant data center. To the user, virtual machines 2312-2315 appear to be like any other machine contained on a traditional network subnet.

The client is also able to add a physical machine to their subnet. In the preferred embodiment, the switches natively support Q-in-Q double tagging, which allows for routing double tagged network packets to physical machines out of the box. In other embodiments, the nested client VLAN is turned into another top-layer VLAN to allow for physical machines on the VLAN.

Clients are able to share resources either between their client VLANs, or in a shared resources network such as resources 2202-2205 in VLAN 2200. In some embodiments, clients are able to connect to these resources by setting up the optional port on their client firewall 2311 to connect to the IP of the selected shared resource. An empty VLAN is created between the ports of both firewalls on both sides as a "virtual wire". Rules are set up on the firewalls on both ends to handle the new traffic. On the client VLAN side, firewall 2311 dynamically adds a virtual port to itself and maps the port in a network address table within client firewall 2311. If a client wishes to share resources from more than one location, multiple optional ports may be added. In this situation, the firewall must be temporarily shutdown to make the configuration.

Figure 3:
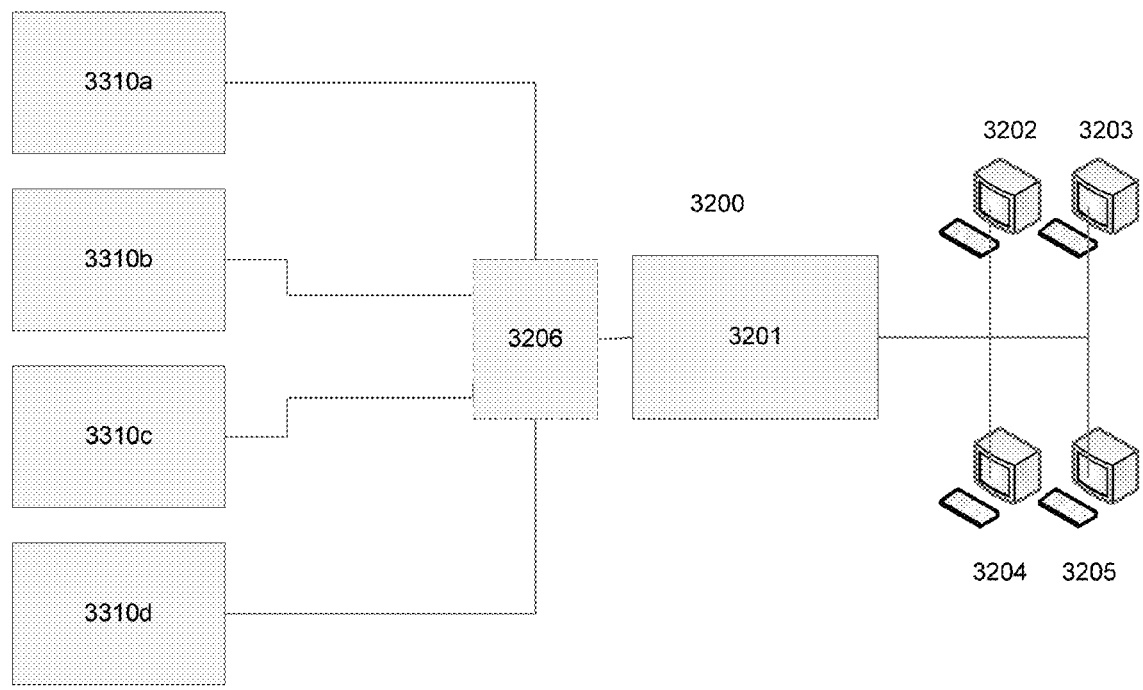
FIG. 3 demonstrates reaching shared resources through a single port of a shared resource firewall.
Figure 4:
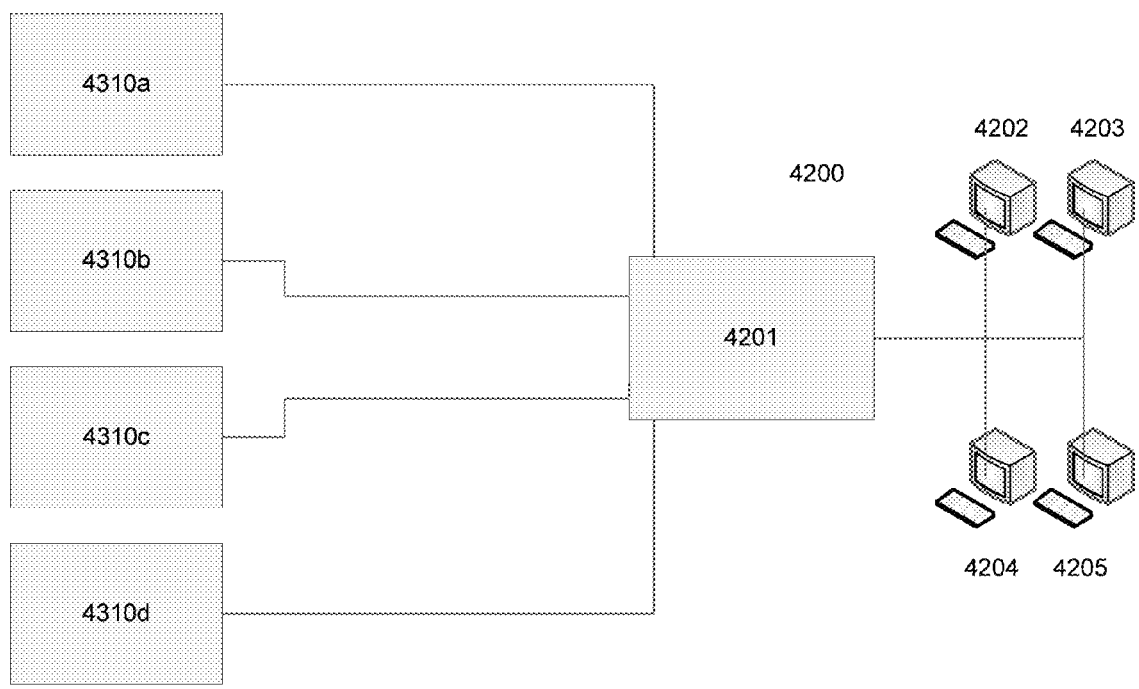
FIG. 4 demonstrates reaching shared resources through multiple ports of a shared resource firewall.

FIG. 3, FIG. 4, and FIG. 5 show alternate embodiments for routing data through system 100. Referring to FIG. 3, shared resource VLAN 3200 and client VLANs 3310 are identical to shared resource network 2200 and client VLANs 2310, respectively. Shared resource firewall 3201 has one port for incoming resource requests. The connection is essentially a "virtual switch", labeled as 3206, that filters traffic based on incoming IPs. Using the "virtual switch", client VLANs 3310 are able to reach their designated shared resources, residing within 3202-3205. Referring now to FIG. 4, shared resource VLAN 4200 and client VLANs 4310 are identical to shared resource network 2200 and client VLANs 2310, respectively. FIG. 4 shows an alternate embodiment that has a separate port on shared resource firewall 4201 for each incoming connection from client VLANs 4310 attempting to use a shared resource 4202-4205. A firewall rule is designed for each individual port.

FIG. 5 illustrates the preferred embodiment of handling shared resources. The system of FIG. 5 is identical to that of FIG. 2 with the addition of each client VLAN 5310 containing a second firewall, private firewall 5316. Private firewall 5316 is not editable by the client and contains predefined rules to reach shared resources within shared resource VLAN 5200 or within another client VLAN, VNC connections to physical machines on the client's subnet, and the management console 5102. Using this non-editable private firewall ensures that a user does not inadvertently change routing rules that hinder routing throughout system 100.

I claim:

1. A method performed by a management local area network (MLAN), comprising:
   receiving indications from a plurality of processing nodes that the plurality of processing nodes are ready to host a number of virtual machines;
   assigning the plurality of processing nodes into groups based on each processing node's capabilities and architecture;
   receiving a list of virtual machines in need of startup from a data source; and
   creating a client virtual local access network (VLAN) for a client, comprising:
      mapping a physical server associated with one of the processing nodes to a virtual device, giving a virtual machine operating on the physical server access to a network outside of a network that the physical server is operating on;
starting a number of virtual machines in accordance with the list of virtual machines on at least some of the processing nodes;
connecting to at least one client firewall; and
adding a rule to at least one of the virtual machines to provide the client associated with the client firewall access to a Web interface to the MLAN.

2. The method of claim 1, further comprising:
starting a number of virtual machines from the list of virtual machines on processing nodes in accordance with a server mask associated with the virtual machines.

3. The method of claim 1, further comprising:
receiving indications of CPU usage information and memory usage information from processing nodes;
starting future virtual machines on the processing nodes based on the CPU usage information and memory usage information, ensuring that CPU usage and memory usage on the processing nodes are evenly distributed across the processing nodes.

4. The method of claim 1, further comprising:
creating an Ethernet device without IP address and routing information associated with at least one of the virtual machines so that a physical server associated with the virtual machine does not see or respond to contents of incoming packets.

5. The method of claim 4, further comprising:
routing console and virtual screen information to the client firewall.

6. The method of claim 1, wherein creating the client VLAN further comprises:
assigning a number of IP addresses and a subnet to the client;
assigning a first address of the subnet to a firewall associated with the client VLAN; and
providing a gateway to the client configured to deliver the client's network packets to the client firewall.

7. The method of claim 6, further comprising:
assigning a second address of the subnet as the MLAN;
receiving an instruction from the client via the second address to add a virtual machine to the client's VLAN client.

8. The method of claim 6, further comprising:
mapping each of the IP addresses to one of a respective MAC address;
creating a DHCP table in the client firewall to store the mappings of the IP addresses to MAC addresses;
assigning one of the IP addresses to the client firewall in accordance with an associated MAC address in the DHCP table.

9. The method of claim 8, further comprising:
assigning one of the MAC addresses to a template image corresponding to a virtual machine chosen by the client;
initializing the template image; and
adding the virtual machine to the list of virtual machines.

10. The method of claim 1, further comprising:
creating an empty VLAN that is not allocated for external traffic between the client firewall and a firewall associated with a shared network resource selected by the client;
adding a virtual port to the client firewall in accordance with a network address table associated with the client firewall; and
sending and receiving data from the shared resource.

11. The method of claim 1, wherein the client firewall further comprises a second firewall, the second firewall not editable by the client and containing predefined rules to reach at least one of shared network resource or another client VLAN.

12. A system comprising:
a plurality of processing nodes configured to host one or more virtual machines; and
a management local area network (MLAN) configured to:
receive indications from a plurality of processing nodes that the plurality of processing nodes are ready to host a number of virtual machines;
assign the plurality of processing nodes into groups based on each processing node's capabilities and architecture;
receive a list of virtual machines in need of startup from a data source;
map a physical server associated with one of the processing nodes to a virtual device, giving a virtual machine operating on the physical server access to a network outside of a network that the physical server is operating on;
start a number of virtual machines in accordance with the list of virtual machines on at least some of the processing nodes;
connect to at least one client firewall; and
add a rule to at least one of the virtual machines to provide the client associated with the client firewall access to a Web interface to the MLAN.

13. The system of claim 12, further comprising:
a server mask associated with the virtual machine and configured to assign the virtual machine to a processing node group,
wherein the MLAN is further configured to start a number of virtual machines from the list of virtual machines on processing nodes group in accordance with the server mask.

14. The system of claim 12, wherein the MLAN is further configured to:
receive indications of CPU usage information and memory usage information from the processing nodes; and
start future virtual machines on the processing nodes based on the CPU usage information and memory usage information, ensuring that CPU usage and memory usage on the processing nodes are evenly distributed across the processing nodes.

15. The system of claim 12, wherein the MLAN is further configured to:
create an Ethernet device without IP address and routing information associated with at least one of the virtual machines so that a physical server associated with the virtual machine does not see or respond to contents of incoming packets.

16. The system of claim 15, wherein the MLAN is further configured to:
route console and virtual screen information to the client firewall.

17. The system of claim 12, wherein the MLAN is further configured to:
assign a number of IP addresses and a subnet to the client;
assign a first address of the subnet to a firewall associated with the client VLAN; and
provide a gateway to the client configured to deliver the client's network packets to the client firewall.

18. The system of claim 17, wherein the MLAN is further configured to:
- assign a second address of the subnet as the MLAN;
- receive an instruction from the client via the second address to add a virtual machine to the client's VLAN client.

19. The system of claim 17, wherein the MLAN is further configured to:
- map each of the IP addresses to one of a respective MAC address;
- create a DHCP table in the client firewall to store the mappings of the IP addresses to MAC addresses;
- assign one of the IP addresses to the client firewall in accordance with an associated MAC address in the DHCP table.

20. The system of claim 19, wherein the MLAN is further configured to:
- assign one of the MAC addresses to a template image corresponding to a virtual machine chosen by the client;
- initialize the template image; and
- add the virtual machine to the list of virtual machines.

21. The system of claim 12, wherein the MLAN is further configured to:
- create an empty VLAN that is not allocated for external traffic between the client firewall and a firewall associated with a shared network resource selected by the client;
- add a virtual port to the client firewall in accordance with a network address table associated with the client firewall; and
- send and receive data from the shared resource.

22. The system of claim 12, wherein the client firewall further comprises a second firewall, the second firewall not editable by the client and containing predefined rules to reach at least one of shared network resource or another client VLAN.

* * * * *